Dec. 15, 1936.   S. THAYER   2,064,577
PIPE CLEANING APPARATUS
Filed June 10, 1935   2 Sheets-Sheet 1

Starr Thayer
INVENTOR.

BY J. Vincent Martin and
John W. Poteet Jr.
ATTORNEYS.

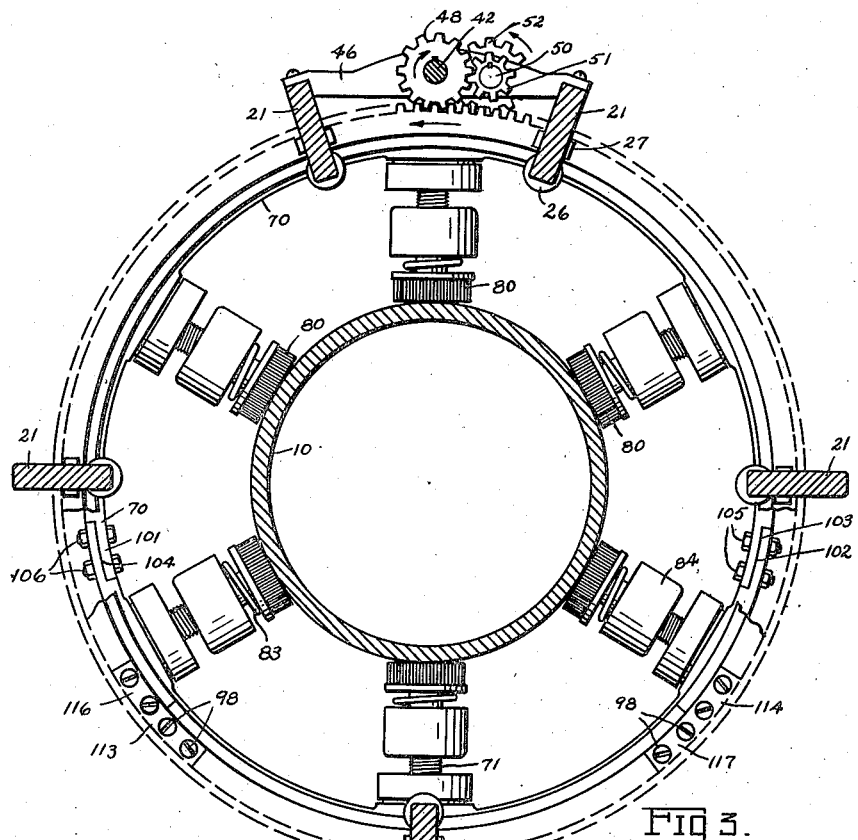

Patented Dec. 15, 1936

2,064,577

UNITED STATES PATENT OFFICE 2,064,577

PIPE CLEANING APPARATUS

Starr Thayer, Houston, Tex.

Application June 10, 1935, Serial No. 25,824

10 Claims. (Cl. 15—104.04)

This invention relates to apparatus for surfacing tubular members, and more especially to pipe cleaning machines.

Apparatus at present available does not satisfactorily clean irregularly surfaced pipe. Portable machines which are available do not satisfactorily clean old pipe whether that pipe be either smooth or rough. The cost of such machines is very high, and the cost of operation of such machines is very great. The present machines are relatively slow in operation, and consume entirely too much time if it is desired to obtain a good thorough cleaning job.

Figure 1:
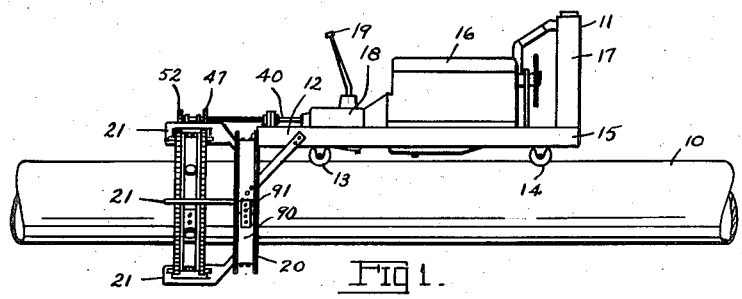
Figure 2:
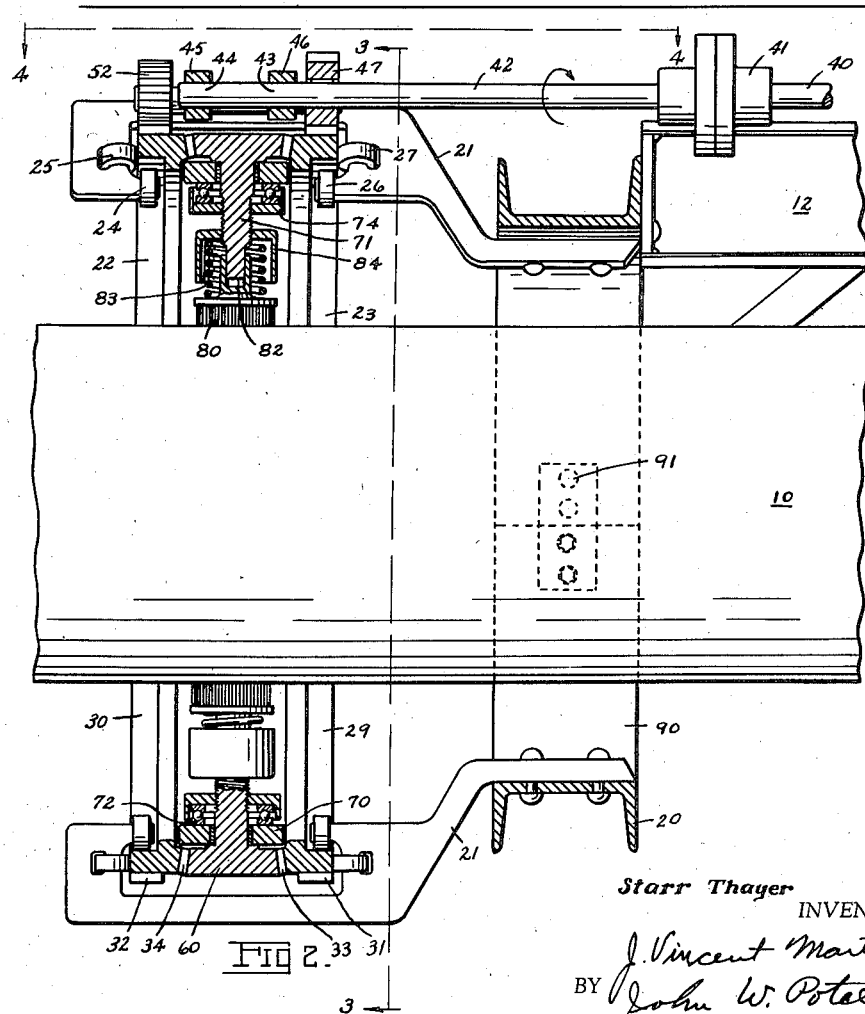

One of the objects of this invention is to provide an improved cleaning machine capable of substantially avoiding the foregoing objections. A further object of this invention is to provide a machine having a new and improved cleaning action on a pipe. Yet further, it is an object of this invention to provide a machine which gives a scrubbing action and utilizes rotary brushes. Additional objects and advantages will be hereafter pointed out in the specification. I have illustrated a preferred embodiment of this invention in the attached drawings, wherein Fig. 1 is a side elevation showing a device mounted upon a pipe; Fig. 2 is an enlarged sectional elevation of the rear portion of the apparatus; Fig. 3 is a transverse section substantially on the line 3—3 of Fig. 2. Fig. 4 is a partial plan view on the line 4—4 of Fig. 2.

Considering the drawings in greater detail, in Fig. 1 is shown a pipe section 10 with a pipe cleaning machine 11 mounted thereon to perform a cleaning operation. This machine comprises a frame work 12 having a plurality of wheels 13 and 14 to move it along the pipe and/or supporting it on the pipe. This frame work 12 comprises a portion 15 carrying an internal combustion engine 16, cooling means 17, and a transmission 18 controlled by a lever 19, for driving the cleaning elements. The framework also includes a part 20 arranged to circumscribe the pipe. This latter part is provided with a plurality of supporting arms 21 spaced about the member 20 and secured in position thereon.

A plurality of ring gears 22 and 23 are mounted to rotate about the pipe and are supported by the arms 21. The arms 21 support these ring gears by a plurality of rolling bearing members 24, 25, 26 and 27. Similar such bearing members are mounted on each of the arms. The rollers 25 and 27 engage the outer side faces of the ring gears and the rollers 24 and 26 engage the inner peripheral faces 30 and 29 of the ring gears. The ring gears are provided with peripheral teeth 31 and 32 upon their outer peripheries, and teeth 33 and 34 on their inner faces. These teeth are provided for the purpose of driving the ring gears, and also driving the pipe engaging elements or means.

For the purpose of driving these ring gears a power drive 40 from the transmission 18 is connected by a coupling 41 to a drive shaft 42. This drive shaft is carried in bearings 43 and 44, which latter are positioned in the cross members 45 and 46 fastened by means of screws or other suitable connections to the arms 21. Mounted upon and keyed to the shaft 42 is a gear 47 having peripheral teeth 48 arranged to engage the teeth 31 on the ring gear 23 and cause it to rotate in a counter-clockwise direction as viewed in Fig. 3. The pinion gear 47 being driven in a clockwise direction as viewed in this figure.

The ring gear 22 is driven from the same mechanism which drives the ring gear 23. In this case a stub shaft 50 is provided, having a pinion gear 51 at one end which engages the pinion 48 and drives the stub shaft in a counter-clockwise direction. At the opposite end of the stub shaft is a gear 52 having peripheral teeth arranged to mesh with the teeth 32 on the ring gear 22. Due to the arrangement of the teeth on the gears 51 and 52 the ring gear 22 is driven in the opposite direction to the ring gear 23, that is clockwise as viewed in Fig. 3. This gear is also driven at a different rate of speed from the ring gear 23.

The two ring gears are spaced apart and have positioned therebetween a plurality of bevel gears 60. These gears are arranged to mesh with the teeth 33 and 34 on the ring gear. This connection allows the bevel gears to rotate upon their own axes, and because of the different speeds of the two ring gears, the bevel gears are caused to rotate about the pipe as well as about their own axes.

Each of the bevel gears 60 is supported on a ring 70 which member spaces the ring gears and their attached pipe-engaging elements in relatively predetermined positions as respects the pipe. The central shaft portion 71 on each of these bevel gears passes through the ring 70 by means of a suitable bearing 72. Secured to this spindle portion 71 is one part of a thrust bearing 74. The opposite side of this bearing member being secured to the ring 70. In this manner any thrust is taken up on this bearing, and the bevel gears are mounted through the intermediation of anti-friction means upon the ring.

The pipe-engaging means is secured to the end of the shaft 71 adjacent the pipe. This means is shown as including a plurality of pipe-engaging elements in the form of brushes 80. It is equally obvious that other pipe cleaning elements may be utilized, for example, milling type cutters or grinding wheels, or any other appropriate means may be substituted. These brushes 80 are yieldably mounted on the shaft 71 by a sliding torque transmitting joint 82 and spring means 83, the latter resting at one end of the brush, and its opposite end engaging a cup-shaped member 84 secured to the spindle.

The manner of operation of the device is readily apparent. The lever 19 is moved to effect the engagement of the component parts of the transmission 18, and to cause the ring gears to be driven from the power means 16. Although this is illustrated as an internal combustion engine, an electric motor might readily be substituted where electric power is available. It is also contemplated that the wheels 13 may be driven from the power drive 40 by suitable gear or chain drives. The device can, if desired, be movable along the pipe by hand by fastening a crank arm and pipe-engaging wheel to the frame work 12 and utilizing a laborer to crank the device along the pipe. The wheels 13 and 14 may be so made as to retain the apparatus in its upright position. It is also contemplated that auxiliary apparatus such as a wheel mounted upon a shaft, which latter is secured to the frame work, may be used. This will maintain the equipment or device in its proper vertical relation. Pipe coating means may be used. Although they are not shown, it is obvious that coating material may be caused to flow adjacent the brushes and be applied to the pipe thereby. It is also contemplated that alternate brushes may be replaced by rasp-like means or other elements to give a different action on the pipe surface.

Although the apparatus as described is available for short sections of pipe, it is equally well arranged to be applied to long pipe lines, and may be removed from the pipe line by means provided for this purpose. This means comprises the split frame work portion 90 with the removable bolts 91. The frame work can be broken by removing the bolts, the lower portion being removed from the upper part.

The ring 70 and the ring gears 22 and 23 are similarly provided with a removable segment, these parts being shown in Fig. 3. The ring 70 is broken at points 101 and 102, having a stepped joint 103 and 104 fastened together by suitable nuts and bolts 105 and 106. These bolts do not interfere with the operation of the parts for the reason that they are out of engagement with other parts of the equipment, although it is obvious that the bolt holes may be countersunk and countersunk heads provided on the bolts so that they do not extend above the ring surface. The ring gears 22 and 23 are broken at the points 113 and 114, and are provided with strip members 116 and 117 secured across the joint by machine screws 98.

It is quite obvious that by means of the last described arrangements the entire apparatus may be removed from a continuous pipe line at any point, the assembling of the machine on a continuous pipe line or its removal therefrom being merely a matter of minutes for the reason that the ring gears and bevel gears are maintained in their proper meshed engagement by the remaining parts of the frame work.

Although a single row of pipe-engaging brushes are illustrated, it is contemplated that under certain exigencies of use that a plurality of such rows of pipe-engaging means may be utilized. The ring gears may be beveled on both sides, or a plurality of separate pairs of ring gears as shown may be assembled in parallel arrangement on the framework, which latter will be changed accordingly.

The springs 83 are replaceable and adjustable, as well as the brushes. A further important feature of the invention resides in the fact that different sizes of pipe may be cleaned with the same apparatus by merely adjusting the position of the brushes with respect to the spindle members. A thorough cleansing and scrubbing action takes place as the result of the spinning of the brushes upon their own axes and their movement around the pipe, so that irregularities are thoroughly cleansed.

Although a preferred embodiment of this invention has been illustrated and described, all modifications within the true spirit and scope of the same are intended to be covered by the hereto appended claims.

I claim:

1. A pipe cleaning machine comprising a support rotatable about the axis of the pipe, a cleaning member rotatably mounted on said support for rotation about an axis extending radially with respect to the pipe, said member being in contact with the pipe at its inner extremity, and means for simultaneously rotating said support about the pipe axis and said member about its axis with respect to said support.

2. A pipe cleaning machine comprising a support rotatable about the axis of the pipe, a cleaning member rotatably mounted on said support for rotation about an axis extending radially with respect to the pipe, means urging said member inwardly along its axis into engagement with said pipe, and means for simultaneously rotating said support about the pipe axis and said member about its axis with respect to said support.

3. A pipe cleaning machine comprising a support rotatable about the axis of the pipe, a cleaning member rotatably mounted on said support for rotation about an axis different from the axis of the pipe, a driven member mounted on the axis of said cleaning member and connected thereto to cause rotation of said cleaning member about its axis when said driven member is rotated, a pair of annular driving members mounted for rotation about the axis of the pipe independently of said support, and of each other, said annular driving members being in driving engagement with said driven member on opposite sides thereof, and means for rotating said driving members about the axis of the pipe at unlike speeds to cause simultaneous rotation of said cleaning member about its axis with respect to said support, and of said support about the axis of the pipe.

4. A pipe cleaning machine comprising a support rotatable about the axis of the pipe, a cleaning member rotatably mounted on said support for rotation about an axis different from the axis of the pipe, a driven pinion mounted on the axis of said cleaning member and connected thereto to cause rotation of said cleaning member about its axis when said driven pinion is rotated, a pair of annular driving gears mounted for rotation about the axis of the pipe independently of said support and of each other, said annular driving gears being in driving engagement with said driven pinion on opposite sides thereof, and means for rotating said driving gears about the axis of the pipe at unlike speeds to cause simultaneous rotation of said cleaning member about its axis with respect to said support, and of said support about the axis of the pipe.

5. A pipe cleaning machine comprising a support rotatable about the axis of the pipe, a cleaning member rotatably mounted on said support for rotation about an axis different from the axis of the pipe, a driven member mounted on the axis of said cleaning member and connected thereto to cause rotation of said cleaning member about its axis when said driven member is rotated, a pair of annular driving members mounted for rotation about the axis of the pipe independently of said support and of each other, said annular driving members being in driving engagement with said driven member on opposite sides thereof, and means for rotating said driving members about the axis of the pipe in opposite directions and at unlike speeds to cause simultaneous rotation of said cleaning member about its axis with respect to said support, and of said support about the axis of the pipe.

6. A pipe cleaning machine comprising a support rotatable about the axis of the pipe, a cleaning member rotatably mounted on said support for rotation about an axis extending radially with respect to the pipe, a driven member mounted on the axis of said cleaning member and connected thereto to cause rotation of said cleaning member about its axis when said driven member is rotated, a pair of annular driving members mounted for rotation about the axis of the pipe independently of said support and of each other, said annular driving members being in driving engagement with said driven member on opposite sides thereof, and means for rotating said driving members about the axis of the pipe at unlike speeds to cause simultaneous rotation of said cleaning member about its axis with respect to said support, and of said support about the axis of the pipe.

7. A pipe cleaning machine comprising a support rotatable about the axis of the pipe, a cleaning member rotatably mounted on said support for rotation about an axis different from the axis of the pipe, a driven member mounted on the axis of said cleaning member and connected thereto to cause rotation of said cleaning member about its axis when said driven member is rotated, a pair of annular driving members mounted for rotation about the axis of the pipe independently of said support and of each other, said annular driving members being in driving engagement with said driven member on opposite sides thereof, and means for rotating said driving members about the axis of the pipe at different speeds to cause simultaneous rotation of said cleaning member about its axis with respect to said support, and of said support about the axis of the pipe, said support and each of said annular driving members having a removable segmental portion whereby the pipe cleaning machine may be removed from or placed in operative position with respect to a continuous pipe.

8. A pipe cleaning machine comprising a support rotatable about the axis of the pipe, a cleaning member rotatably mounted on said support for rotation about an axis extending radially with respect to the pipe, a driven pinion mounted on the axis of said cleaning member and connected thereto to cause rotation of said cleaning member about its axis when said driven pinion is rotated, a pair of annular driving gears mounted for rotation about the axis of the pipe independently of said support and of each other, said annular driving gears being in driving engagement with said driven pinion on opposite sides thereof, and means for rotating said driving gears about the axis of the pipe at different speeds to cause simultaneous rotation of said cleaning member about its axis with respect to said support, and of said support about the axis of the pipe.

9. A pipe cleaning machine comprising a support rotatable about the axis of the pipe, a cleaning member rotatably mounted on said support for rotation about an axis extending radially with respect to the pipe, a driven pinion mounted on the axis of said cleaning member and connected thereto to cause rotation of said cleaning member about its axis when said driven pinion is rotated, a pair of annular driving gears mounted for rotation about the axis of the pipe independently of said support and of each other, said annular driving gears being in driving engagement with said driven pinion on opposite sides thereof, and means for rotating said driving gears about the axis of the pipe in opposite directions and at unlike speeds to cause simultaneous rotation of said cleaning member about its axis with respect to said support, and of said support about the axis of the pipe.

10. A pipe cleaning machine comprising a support rotatable about the axis of the pipe, a cleaning member mounted on said support for rotation about an axis extending radially with respect to the pipe, a driven pinion mounted on the axis of said cleaning member and connected thereto to cause rotation of said cleaning member about its axis when said driven pinion is rotated, a pair of annular driving gears mounted for rotation about the axis of the pipe independently of said support and of each other, said annular driving gears being in driving engagement with said driven pinion on opposite sides thereof, means for rotating said driving gears about the axis of the pipe in opposite directions, and at unlike speeds to cause simultaneous rotation of said cleaning member about its axis with respect to said support, and of said support about the axis of the pipe, and means for propelling the pipe cleaning machine along a pipe.

STARR THAYER.